United States Patent
Frauhammer et al.

(10) Patent No.: US 6,918,728 B1
(45) Date of Patent: Jul. 19, 2005

(54) CIRCLIP

(75) Inventors: Karl Frauhammer, Leinfelden-Echterdingen (DE); Manfred Hellbach, Leinfelden-Echterdingen (DE); Frank Mueller, Deckenpfronn (DE); Heinz Schnerring, Dettenhausen (DE); Joerg Friedrich, Leinfelden-Echterdingen (DE); Andreas Strasser, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/049,363

(22) PCT Filed: Jul. 1, 2000

(86) PCT No.: PCT/DE00/02149

§ 371 (c)(1),
(2), (4) Date: Jul. 16, 2002

(87) PCT Pub. No.: WO01/11249

PCT Pub. Date: Feb. 15, 2001

(30) Foreign Application Priority Data

Aug. 6, 1999 (DE) ................................ 199 36 708

(51) Int. Cl.⁷ ............................................. F16B 21/18
(52) U.S. Cl. ..................................................... 411/518
(58) Field of Search .......................... 411/353, 517–523

(56) References Cited

U.S. PATENT DOCUMENTS

| 2,450,306 | A | * | 9/1948 | Sickles |
| 2,896,287 | A | * | 7/1959 | Stultz |
| 3,442,171 | A |  | 5/1969 | Englemann |
| 3,765,065 | A | * | 10/1973 | Hay |
| 5,207,462 | A |  | 5/1993 | Bartholomew |
| 5,370,590 | A |  | 12/1994 | Premiski et al. |
| 5,615,582 | A |  | 4/1997 | Rupp |

FOREIGN PATENT DOCUMENTS

WO   WO 97 12170   4/1997

OTHER PUBLICATIONS

H. Roloff/W.Matek, "Maschinenelemente"[Machine Elements], 5th edition, p. 179, lines 1 through 5.

* cited by examiner

Primary Examiner—Flemming Saether
(74) Attorney, Agent, or Firm—Kenyon & Kenyon

(57) ABSTRACT

A snap ring for shafts or bores is proposed, which is able to be axially fixed in position by snapping into place in a circumferential groove. The snap ring is provided with a centering ring which, when the case of the snap ring is installed in the circumferential groove, extends with radial clearance to an annular clip of the snap ring, which is disposed approximately concentrically to the circumferential groove.

7 Claims, 2 Drawing Sheets

CIRCLIP

FIELD OF THE INVENTION

The present invention is directed to a snap ring.

BACKGROUND INFORMATION

Snap retaining rings are already known which are used for axially securing structural components, such as bearings, gears, or sealing rings to shafts or bores. Snap rings of this kind can be designed to engage with radially inwardly open circumferential grooves, in bores, or with radially outwardly open circumferential grooves, in shafts. These snap rings exist in various removable and non-removable designs. They also constitute the subject matter of various standards (e.g., DIN, ISO). The snap rings are normally grooved with undersized and/or oversized dimensions, so that, once inserted into a corresponding circumferential groove, they are held by self-action in the shaft or bore, under prestressing. For example, International Patent Application WO 79/12170 discloses a snap ring which is provided with a centering member that extends with radial clearance to a circumferentially disposed annular clip of the snap ring which forms two limbs.

SUMMARY OF THE INVENTION

The advantage of the snap ring according to the present invention is that, in addition to the axial retaining function, it also enables a centering action to be performed between a bore and a shaft or spindle to be inserted therein during assembly. In this manner, one can prevent a shaft sealing ring located between a bore and a shaft from becoming damaged, for example, by sharp edges or offsets during assembly due to the shaft and bore becoming skewed. Thus, one avoids a premature failure of the sealing action of the shaft sealing ring.

Due to the fact that the radial cross-sections of the two limbs of the snap ring taper off towards their unattached ends, the snap ring is uniformly deformed in response to its two limbs being compressed upon installation.

DETAILED DESCRIPTION

Figure 1:
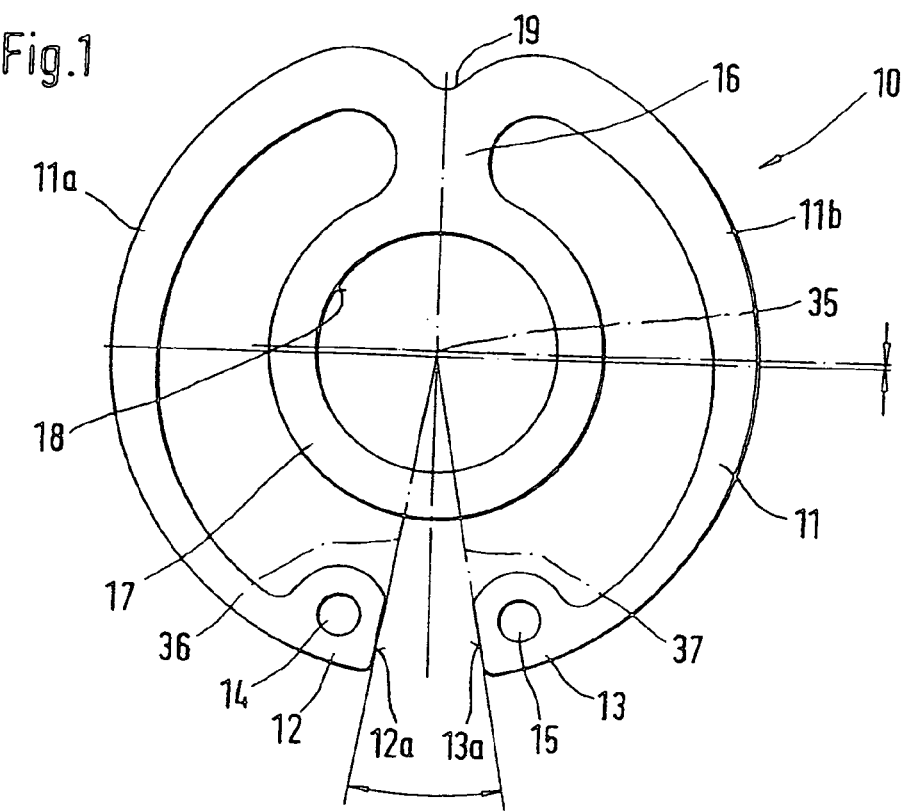
FIG. 1 shows a plan view of a snap ring according to the present invention, having a centering function in accordance with a first exemplary embodiment.

In FIG. 1, 10 denotes a snap ring which has a concentrically disposed, or approximately annular, slotted clip 11 of resilient material, in particular of spring steel. At its two free ends, clip 11 has lugs 12, 13, through each of which perforations 14, 15 are cut. As is generally known, into perforations 14, 15, one may insert snap ring pliers, which, by changing the distance between lugs 12, 13, make it possible to vary the diameter of clip 11 in order to install snap ring 10.

In FIG. 1, snap ring 10 is designed as an internal ring for a radially inwardly open circumferential groove and is, therefore, suited for axially securing a component to a bore. Located inside clip 11 is a centering ring 17, which is joined to clip 11 by way of a web 16. Centering ring 17 is provided with a center bore 18, which is disposed approximately concentrically with respect to snap ring 10 and to a corresponding circumferential groove into which snap ring 10 is insertable. On the side of clip 11 facing opposite web 16, a notch 19 is provided, which divides clip 11 into two limbs 11a, b. Limbs 11a, b are formed with a radial cross-section that tapers off toward the unattached ends, resulting in a uniform deformation when snap ring 10 is installed. Located at each of the mutually opposing surfaces of lugs 12, 13 are flat portions 12a, 13a, which are used as mutual stop faces. In this context, flat portions 12a, 13a are aligned in parallel to radial traces 36, 37, respectively, which run through a midpoint 35 of snap ring 10. The stop faces ensure that the material stress that clip 11 is subject to during installation of snap ring 10 is kept within acceptable limits.

Figure 2:
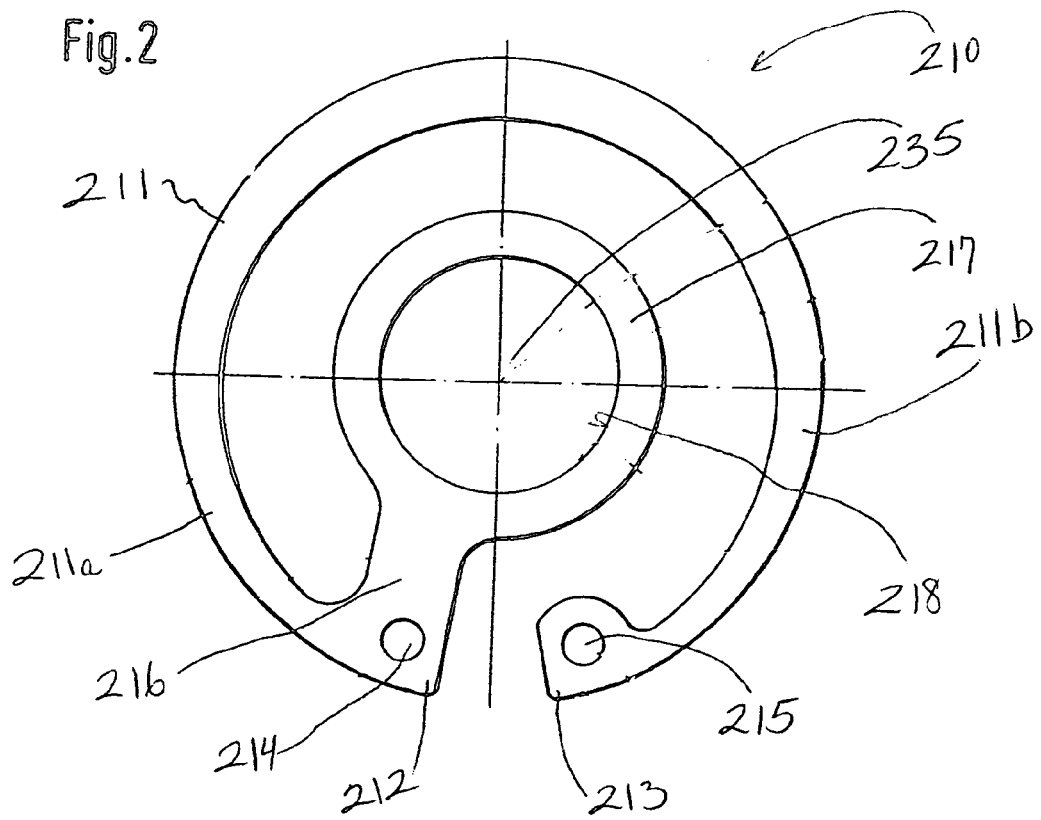
FIG. 2 illustrates a plan view of a snap ring according to the present invention, having a centering function in accordance with a second exemplary embodiment.

FIG. 2 illustrates a second exemplary embodiment of a snap ring 210 having a centering function. Equivalent parts and parts performing equivalent functions as those shown in FIG. 1 are denoted in FIG. 2 by reference numerals which are formed by adding a prefix "2" to the corresponding reference numerals shown in FIG. 1. In comparison to the exemplary embodiment according to FIG. 1, the second exemplary embodiment according to FIG. 2 is distinguished by web 216 being located in the vicinity of a lug 212. In this context, centering ring 217 is likewise encircled by clip 211, so that snap ring 210 shown in FIG. 2 is likewise designed as an internal ring.

Figure 3:
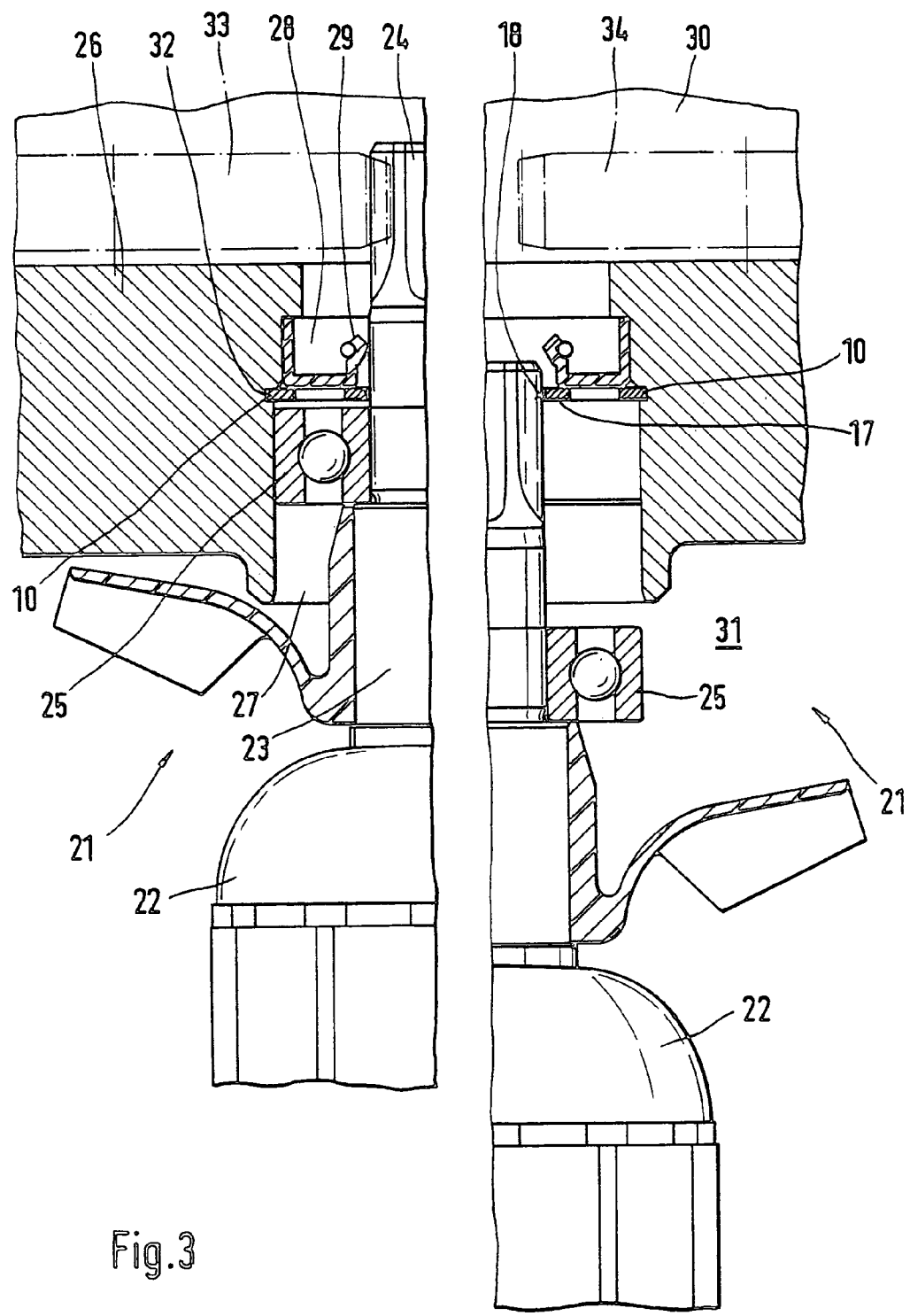
FIG. 3 is a part-sectional view through a hammer drill, which has a snap ring according to the present invention, having a centering function.

FIG. 3 depicts an application case for a snap ring 10 according to the present invention. Here, FIG. 3 shows a partial section through a driving device 21 of a hammer drill. In the left half of the illustration of FIG. 3, the driving device is shown in a final assembled position, while in the right half, it is shown during assembly.

An electromotor 22 has a motor shaft 23, which is provided on the inside with an armature pinion 24. In this context, motor shaft 23 is rotationally mounted via an antifriction roller bearing 25 at a gear housing 26. Seated next to and in front of antifriction bearing 25 in a through-hole 27 in gear housing 26 is a sealing ring 28, which, by way of its sealing lip 29, seals off a gear compartment 30 from a motor compartment 31. For that purpose, sealing lip 29 engages on the outer surface of motor shaft 23 (left half of the illustration in FIG. 3). Within through-hole 27, sealing ring 28 is axially secured by snap ring 10. In this context, snap ring 10 is seated, under prestressing, in a concentrically disposed, internal groove 32 in gear housing 26.

In the right half of FIG. 3, driving device 21 is shown in its assembled position. Here, antifriction bearing 25 is pressed onto motor shaft 23 and is installed, together with motor shaft 23 and electromotor 22, in through-hole 27. In so doing, armature pinion 24 initially reaches through centering bore 18 in centering ring 17, and is radially guided by the same. In response to further insertion of driving device 21, armature pinion then reaches through the sealing opening formed by sealing lips 29, deeper into bore 27, until it subsequently engages fully with gears 33, 34 in gear compartment 30, as shown in the left half of the illustration. Centering ring 17, which, together with snap ring 10, forms one unit, prevents the sealing lip from being damaged by armature pinion 24, which may be sharp-edged, during insertion of driving device 21. To this end, centering bore 18 is designed to be approximately concentric with circumferential groove 32.

The present invention is not limited to the described exemplary embodiments. Thus, when working with a snap ring designed as an external ring for shafts, it is also possible for the centering ring to wrap around the outside of the clip. In place of one web, a plurality of webs may also be provided for joining the centering ring and clip.

What is claimed is:

1. A snap ring for shafts or bores fixable in axial position by snapping into a circumferential groove, the snap ring comprising:
    a substantially annular clip having two portions, each portion having two end sections, wherein for each portion of the annular clip, the radial cross-section continuously decreases from one end section to the other end section;
    a centering member radially separated from the clip; and
    at least one web joining the centering member to the clip, the at least one web being situated near one of the end sections of one of the two portions of the annular clip.

2. The snap ring of claim 1, wherein the centering member is configured as a centering ring having a center bore, the centering ring being positioned approximately concentrically with respect to the circumferential groove when the snap ring is installed in the circumferential groove.

3. The snap ring of claim 1, wherein the clip encircles the centering member, and the snap ring is configured as an internal ring for a radially inwardly open circumferential groove.

4. The snap ring of claim 1, wherein one of the end sections of each of the the portions of the clip is formed as a lug.

5. The snap ring of claim 4, wherein the lugs have flat surfaces mutually opposing one another, the flat surfaces being used as mutual stop faces.

6. The snap ring of claim 5, wherein the flat surfaces of the lugs are aligned radially with respect to a midpoint of the snap ring.

7. A method of axially fixing a sealing ring in position, the sealing ring including at least one sealing lip which is provided for making contact on a shaft, the method comprising:
    snapping a snap ring into a circumferential groove, the snap ring including:
        a substantially annular clip having two portions, each portion having two end sections, wherein for each portion of the annular clip, the radial cross-section continuously decreases from one end section to the other end section;
        a centering member radially separated from the clip; and
        at least one web joining the centering member to the clip, the at least one web being situated near one of the end sections of one of the two portions of the annular clip; and
    positioning the sealing ring in a position axially adjacent to the snap ring.

* * * * *